United States Patent [19]

Ishitate et al.

[11] Patent Number: 4,545,674
[45] Date of Patent: Oct. 8, 1985

[54] ORIGINAL PLACING STAND DEVICE

[75] Inventors: Yoshiyuki Ishitate; Toshikatsu Takahashi, both of Kanagawa, Japan

[73] Assignee: Fuji Xerox Company, Limited, Tokyo, Japan

[21] Appl. No.: 359,010

[22] Filed: Mar. 17, 1982

[30] Foreign Application Priority Data

Mar. 19, 1981 [JP] Japan ................................ 56-38716

[51] Int. Cl.[4] .................................... G03B 27/62
[52] U.S. Cl. ........................................ 355/75; 355/53
[58] Field of Search ................................ 355/75, 53

[56] References Cited

U.S. PATENT DOCUMENTS

| | | | |
|---|---|---|---|
| 2,255,319 | 9/1941 | Kanter | 355/75 |
| 2,510,363 | 6/1950 | Anderson | 355/75 |
| 3,415,600 | 12/1968 | Yarbrough | 355/75 |
| 3,876,301 | 4/1975 | Kosugi et al. | 355/53 |
| 4,183,663 | 1/1980 | Greenly et al. | 355/53 |
| 4,188,115 | 2/1980 | Marvin | 355/75 |
| 4,285,592 | 8/1981 | Sassenberg | 355/53 |
| 4,362,385 | 12/1982 | Lobach | 355/53 |

Primary Examiner—Monroe H. Hayes
Attorney, Agent, or Firm—Sughrue, Mion, Zinn, Macpeak, and Seas

[57] ABSTRACT

A microfilm copier includes a holding device for the aperature card or the like which is rotatable through a 90° angle so that copying can be effected in either the lengthwise or widthwise direction of the sheet roll comprising the copying medium. The copied images may be of differing magnification in order to minimize the creation of blank, unused portions in the sheet.

2 Claims, 11 Drawing Figures

ORIGINAL PLACING STAND DEVICE

BACKGROUND OF THE INVENTION

This invention relates to a placing stand device for an original which can change the scanning direction according to the ratio of the horizontal and vertical lengths of a picture which is recorded on a microfilm.

A copying machine for aperture cards is available which is used to enlarge and copy a picture which is recorded in the microfilm of the aperture card. In the copying machine, as shown in FIG. 1, an aperture card 5 is positioned on a placing stand 1 by using a plurality of stoppers 2 through 4 which are set on the stand 1, and then the stand 1 is moved in the direction of the arrow so as to subject the microfilm 6 to slit exposure in a direction perpendicular to the direction of movement, so that a latent image corresponding to the picture 6A is formed on a photo-sensitive material (not shown). In one copying machine of this type, which uses a sheet roll as a recording sheet, a length L with respect to the width W of the sheet roll 7 is selected according to the ratio of the lengths of the sides of a rectangular frame which corresponds to the contours of the area in which the picture 6A is recorded, as shown in FIG. 2. The sheet roll 7 is cut to the length L thus selected, to obtain a piece of recording sheet. The picture 6A is enlarged and copied as an image 8 on the piece of recording sheet thus obtained.

When it is necessary to provide two kinds of copies of different magnification factors, the above-described copying machine using the sheet roll must employ a method in which two different sheet rolls, whose widths are respectively equal to the lengths of first sides of the copies, are selectively used, or a method in which, as shown in FIG. 3, a sheet roll 9 suitable for the larger size copy is prepared and a part of the region selected for the larger size copy is used to form a copied image 11 smaller in size. However, these methods are disadvantageous in that the copying operation is complicated because the sheet roll must be exchanged, and in forming a copy of smaller size, the sheet must be manually cut to desired dimensions so as to remove the blank regions. These difficulties may be eliminated by the provision of a device which allows the copying machine to selectively use two different sheet rolls incorporated therein, to thereby eliminate the work of the operator in exchanging the sheet roll. However, the provision of such a device causes additional drawbacks in that, for instance, the copying machine becomes bulky.

SUMMARY OF THE INVENTION

In view of the foregoing, an object of this invention is to provide a placing stand device which can form two kinds of copied images of different magnification on one kind of sheet roll while minimizing the creation of blank portions in the sheet.

In this invention, the microfilm mounting plate of a placing stand is made turnable, so that the scanning operation is carried out not only when an aperture card 5 is set at the regular position A but also when it is set at a position B obtained by turning the microfilm mounting plate through 90°, as shown in FIG. 4. Thus, the direction of scanning the picture recorded on the microfilm is turned substantially through 90°, so that the side, in the scanning direction, of the picture which is set along the length L of the sheet roll 7 in FIG. 2 is now set along the width W of the sheet roll 7 as shown in FIG. 5, whereby two kinds of copied images 8 and 13 are formed on one kind of sheet roll.

DETAILED DESCRIPTION OF THE PREFERRED EMBODIMENTS

Figure 6:
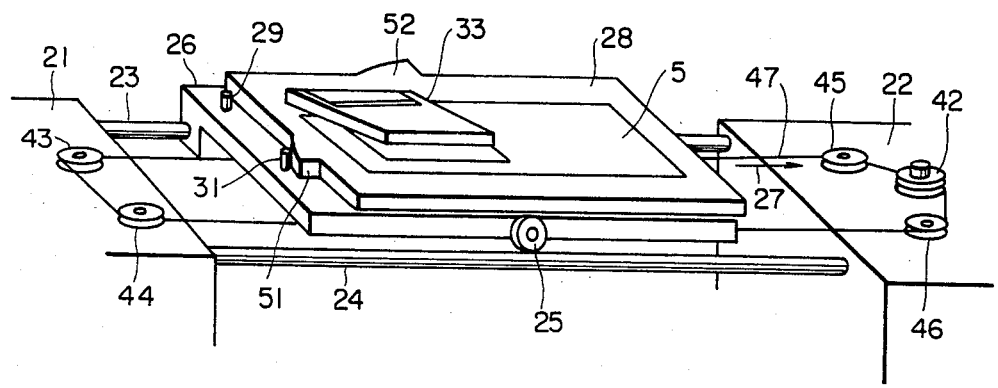
FIG. 6 is a perspective view of a placing stand device according to the invention.
Figure 7:
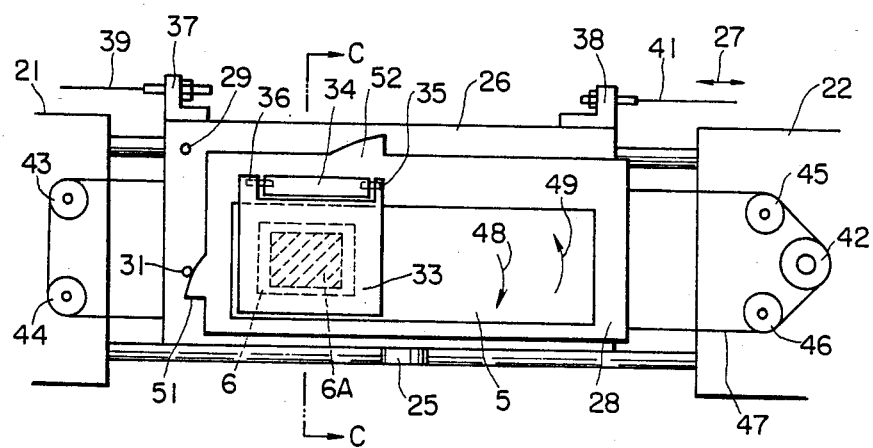
FIG. 7 is a top view of the device of FIG. 6.

FIG. 6 is a perspective diagram of a placing stand device for an aperture card as viewed from above, obliquely, and FIG. 7 is a top view of the device. In the device, a pair of supporting stands 21 and 22 are disposed on both sides of the optical path of an optical system (not shown), respectively. Two parallel sliding shafts 23 and 24 are connected to the walls of the supporting stands, which confront each other. A sliding stand 26 is set on the sliding shafts 23 and 24 through a bearing 25 and a sliding bearing (not shown) in such a manner that it can reciprocate freely in the direction of an arrow 27.

The sliding stand 26 is provided with a rotary plate 28 which is freely rotatable in a horizontal plane, two pins 29 and 31 for limiting the angle of rotation of the rotary plate 28, and a card retainer 33 for fixing an aperture card 5 on the rotary plate 28. The card retainer 33 is coupled to pins 35 and 36 embedded in a plate 34 which is fixedly secured to the rotary plate 28, so that card retainer 33 may be pivoted to fix an aperture card on the rotary plate 28.

The sliding stand 26 is slid in the directions of the arrow 27 by moving two wires 39 and 41 which are connected to brackets 37 and 38, respectively, mounted on opposite sides of the sliding stand 26. An endless wire 47 is wound several turns on a drive pulley, which is provided on the upper surface of the supporting stand 22, and the wire 47 is then laid over rotatable pulleys 43 and 44 on the supporting stand 21 and rotatable pulleys 45 and 46 on the supporting stand 22. Thus, the rotary plate 28 is turned in the direction of the arrow 48 (or clockwise) or in the direction of the arrow 49 by moving the wire 47. The rotary plate 28 has protrusions 51 and 52 which operate to stop the rotation of the rotary plate 28 when brought into contact with the afore-mentioned pins 29 and 31.

Figure 8:
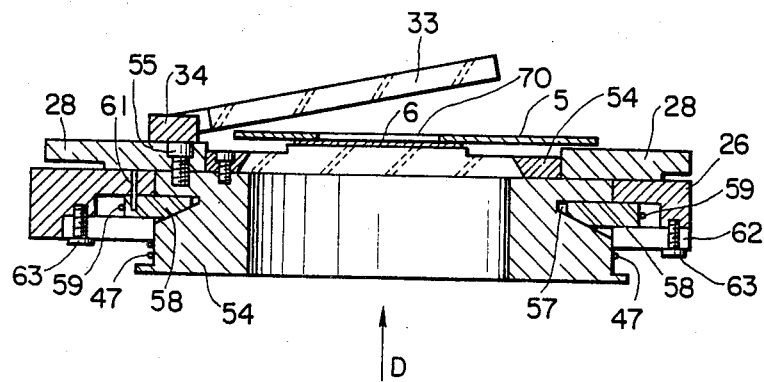
FIG. 8 is a sectional view taken along the line C—C of FIG. 7.
Figure 9:
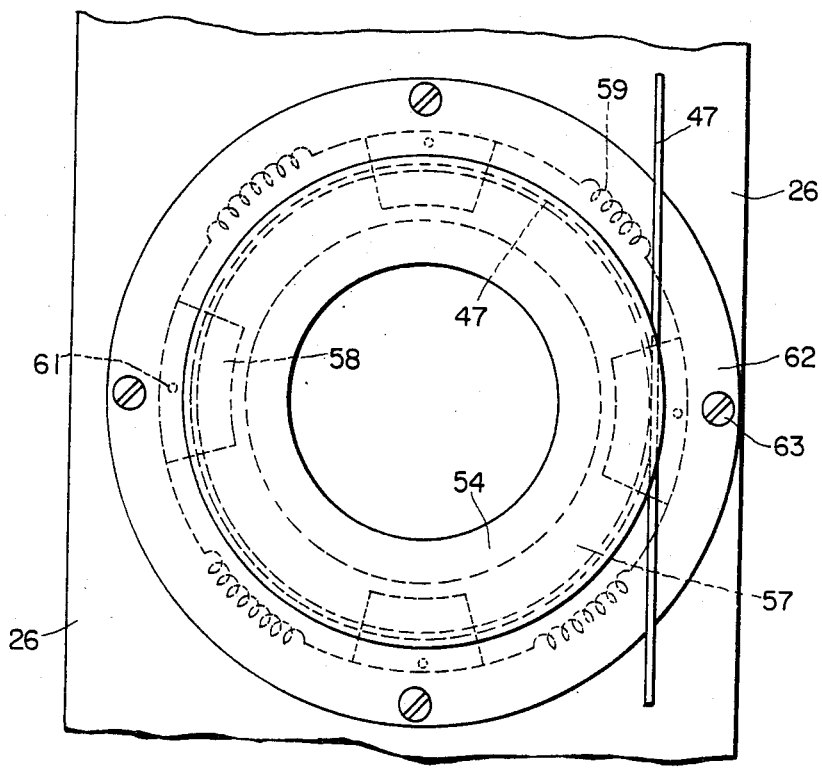
FIG. 9 is a bottom view of the placing stand device as viewed in the direction D.

A rotary shaft 54 is provided below the rotary plate 28, as shown in FIGS. 8 and 9. The aforementioned wire 47 is wound on the rotary shaft 54. The rotary plate 28 is fixedly secured to the rotary shaft 54 with screws 55. A glass plate 70, which is brought into contact with a microfilm 6 bonded to the aperture card 5, is also fixedly secured to the rotary shaft 54 with a retaining ring 56. The rotary shaft 54 is in the form of a hollow pipe, the hollow of which is immediately below the microfilm 6, so that light is transmitted through the hollow. An annular groove 57 is cut in the outer wall of the rotary shaft 54, and four wedges 58 are set in the annular groove 57 at equal intervals in such a manner that they are freely slidable. These wedges 58 are pushed towards the center of the rotary shaft 54 by springs 59, and are maintained non-rotatable by pins 61 which are inserted into the sliding stand 26 and the wedges. An annular cover 62 is secured to the lower surface of the sliding stand 26 with screws 63 so that the wedges 58 are retained in place.

Figure 1:
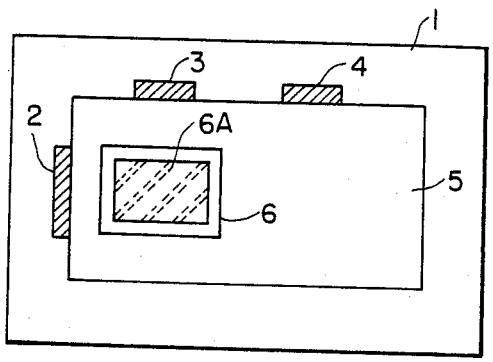
FIG. 1 is a plan view showing an aperture card which is placed on a conventional placing stand.
Figure 2:
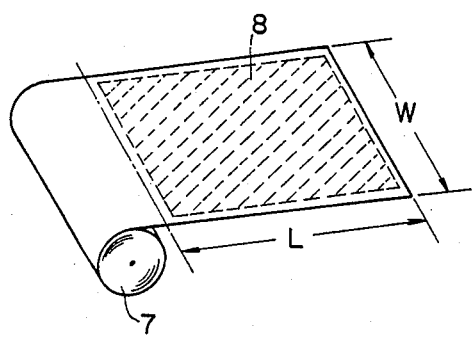
FIG. 2 is an explanatory diagram for describing the formation of a copied image under the condition where the width of a sheet roll is set corresponding to the short side of a picture region.
Figure 3:
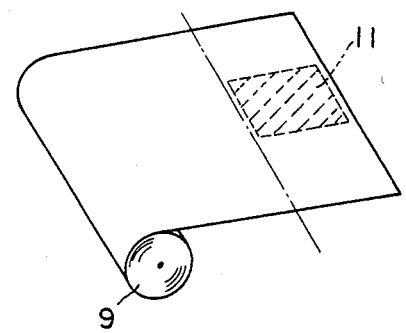
FIG. 3 is an explanatory diagram for describing a conventional method of forming a copied image of smaller size on one sheet roll.
Figure 4:
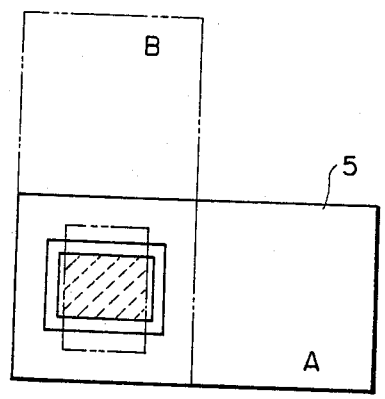
FIG. 4 is a diagram for describing the principle of the invention.
Figure 5:
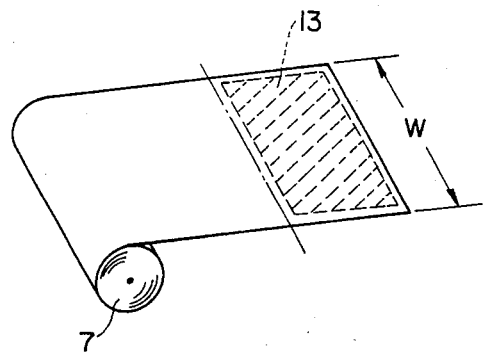
FIG. 5 is a plan view for describing a method of forming a copied image under the condition where the width of the sheet roll is set corresponding to the long side of the picture region.

It is assumed that, in the placing stand device thus constructed, the protrusion 51 is in contact with the pin 31 and the sliding stand 26 and the rotary plate 28 are positioned as shown in FIG. 7. It is further assumed that an aperture card 5 is placed at a predetermined position on the rotary plate in such a manner that the longitudinal direction of the aperture card 5 coincides with the direction of the long side of the rectangular frame, which corresponds to the contour of the region where the picture 6A is recorded. Where the width W of the sheet roll 7 incorporated in the copying machine is set corresponding to the short side of the aforementioned rectangular frame of the picture 6A as shown in FIG. 2, a copied image 8 is obtained as follows. In this case, in the copying machine, the magnification of the optical system is selected so that the length of the short side of the rectangular frame described above is slightly shorter than the width W of the sheet roll 7, and the drive pulley 42 is disconnected from the drive source (not shown) so as to be freely rotatable. Under this condition, the two wires 39 and 41 are moved to the right in FIG. 7 at a speed corresponding to the copying magnification, and the sliding stand 26 is thus also moved at this speed, as a result of which the picture 6A on the microfilm is subjected to slit exposure and is scanned at this speed. The wire 47 is moved in association with the movement of the sliding stand 26; however, the rotary shaft 54 is maintained stationary because of the frictional resistance of the wedges 58. Thus, the image of the picture 6A is correctly formed on a photo-sensitive material such as an electrostatic drum; that is, a copied image 8 free from distortion can be obtained (FIG. 2).

Where the width W of the roll 7 is set corresponding to the long side of the aforementioned rectangular frame of the picture 6A as shown in FIG. 5, a copied image 13 is obtained as follows. In this case, in the copying machine, the magnification of the optical system is selected so that the length of the long side of the aforementioned frame is slightly shorter than the width W of the sheet roll 7, and the two wires 39 and 41 are fixedly held by means such as a brake. Under this condition, the drive pulley 42 is connected to the drive source so that it is turned counterclockwise. As the drive pulley 42 is turned, the wire 47 is pulled, but the sliding stand 26 is not moved in the direction of the arrow 27, because the wires 39 and 41 are fixedly held. Accordingly, the rotary shaft 54 is turned in the direction of the arrow 49, overcoming the frictional resistance of the wedges 58, and is then stopped when the protrusion 52 contacts the pin 29, so that the aperture card 5 is turned through 90°. After aperture card 5 has been turned through 90°, the drive pulley 42 is disconnected from the drive source, and the two wires 39 and 41 are moved at a speed corresponding to the copying magnification. Thus, the picture 6A is scanned, and the copied image 13 thus obtained (FIG. 5) is free from distortion.

According to the invention, the original placing stand is turned to change the microfilm scanning direction, as described above. Therefore, the device of the invention can be made compact, unlike the conventional machine in which the sheet roll supplying means is turned.

Figure 10:
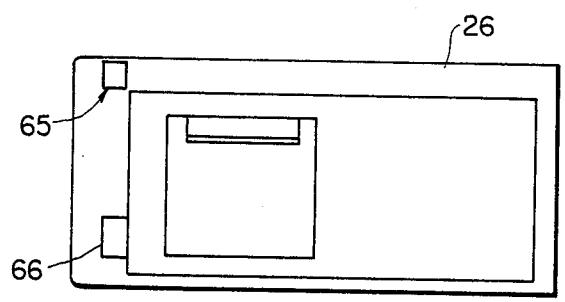
FIG. 10 is a plan view showing one modification of the placing stand device according to the invention.
Figure 11:
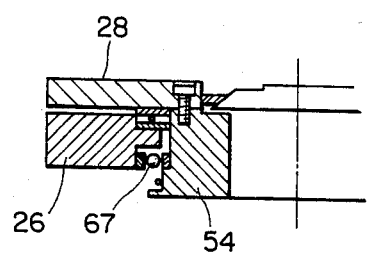
FIG. 11 is a sectional view of the modification in FIG. 10.

In the above-described embodiment, the rotation of the rotary shaft due to the tension of the wire laid over the pulley and the frictional forces of the pulley during the movement of the sliding stand is prevented by the frictional resistance of the wedges, which is provided by the elastic force of the springs; however, it goes without saying that rotation can be prevented by other means. For instance, as shown in FIG. 10, magnets 65 and 66 are set at suitable positions on the sliding stand 26, so that they attract an end face of the rotary plate 28 to fix the position thereof. In this case, it is unnecessary to apply the frictional force to the rotary shaft. Therefore, the device may be modified as shown in FIG. 11, i.e., ball bearings 67 or the like may be disposed between the sliding stand 26 and the rotary shaft 54 supporting the rotary plate 28.

The rotary position of the rotary plate 28 may be effectively set by using a solenoid, a step motor or a servo motor. The use of the step motor or servo motor is preferable because the positioning protrusions and pins can be eliminated and the position can be finely adjusted by electrical means. In the above-described embodiment, the rotary plate is turned mechanically; however, the invention is not limited thereto or thereby. That is, any means may be employed to turn the rotary plate, as long as it can be operated directly by the operator.

In the above-described embodiment, the aperture card is placed horizontally on the placing stand; however, it goes without saying tht the device may be modified so as to hold the aperture card vertically. The technical concept of the invention is applicable not only to the placing stands for aperture cards but also to like devices for microfilm which is not set in aperture cards. Furthermore, it is obvious that the width of the sheet roll employed in a copying machine using the placing stand device of the invention is not particularly limited.

What is claimed is:

1. A copying machine for enlarging and copying microfilm comprising:
    a rectangular frame for holding said microfilm;
    a sheet roll onto which a copy of said microfilm is produced, said sheet roll being cut to produce individual sheets;
    a placing stand device including a rotary plate for rotatably holding said microfilm in a plane parallel with a surface of said microfilm;
    means for rotating said rotary plate comprising motor means, transmission means including at least one pulley and means for limiting the extent of rotation of said rotary plate; and means for scanning an image recorded on said microfilm along either a short or long side of said frame so that two different sized copies can be produced selectively;

said rotary plate including shaft means for receiving torque from said motor means via said transmission means and friction means between said shaft means and a stationary member for increasing the force required to rotate said rotary plate;

said friction means comprising a plurality of wedges, spring means for biasing said wedges into an annular groove in said shaft means, a plurality of pins insertable into said wedges and connectable to a non-rotatable member, and an annular retaining cover for retaining said wedges in said annular groove.

2. A copying machine for enlarging and copying microfilm comprising:

a rectangular frame for holding said microfilm;

a sheet roll onto which a copy of said microfilm is produced, said sheet roll being cut to produce individual sheets;

a placing stand device including a rotary plate for rotatably holding said microfilm in a plane parallel with a surface of said microfilm;

means for rotating said rotary plate comprising motor means, transmission means including at least one pulley and means for limiting the extent of rotation of said rotary plate; and means for scanning an image recorded on said microfilm along either a short or long side of said frame so that two different sized copies can be produced selectively;

said transmission means including at least one drive pulley, a plurality of idler pulleys, said drive pulley and said idler pulleys being disposed on opposite sides of said shaft means and an endless wire interconnecting said shaft means with said drive pulley and said idler pulley.

* * * * *